(12) United States Patent
Briggs et al.

(10) Patent No.: US 6,267,885 B1
(45) Date of Patent: Jul. 31, 2001

(54) LIQUID STERILIZATION APPARATUS

(75) Inventors: William Ernest Briggs, Victoria; John Thomas Fisher-Stamp, Bellbowrie, both of (AU)

(73) Assignee: Austech Pty., Ltd., Richmond (AU)

( * ) Notice: Subject to any disclaimer, the term of this patent is extended or adjusted under 35 U.S.C. 154(b) by 0 days.

(21) Appl. No.: 09/011,313

(22) PCT Filed: Nov. 28, 1996

(86) PCT No.: PCT/AU96/00768

§ 371 Date: Jul. 15, 1998

§ 102(e) Date: Jul. 15, 1998

(87) PCT Pub. No.: WO97/19896

PCT Pub. Date: Jun. 5, 1997

(Under 37 CFR 1.47)

(30) Foreign Application Priority Data

Nov. 28, 1995 (AU) ................................. PN6857
Feb. 16, 1996 (AU) ................................. PN8110

(51) Int. Cl.⁷ .......................... C25B 15/00; C25D 21/00
(52) U.S. Cl. .................. 210/205; 210/209; 210/748; 210/759; 204/275; 204/228; 204/229
(58) Field of Search ................................... 210/748, 759, 210/205, 209; 204/275, 228, 229

(56) References Cited

U.S. PATENT DOCUMENTS

| | | |
|---|---|---|
| 2,105,835 | 1/1938 | Krause . |
| 3,654,119 | 4/1972 | White et al. . |
| 4,119,517 | 10/1978 | Hengst ................................. 204/229 |
| 4,525,253 | 6/1985 | Hayes et al. ........................ 204/149 |
| 4,936,979 | 6/1990 | Brown .................................. 210/85 |
| 5,928,481 | * 7/1999 | Briggs . |

FOREIGN PATENT DOCUMENTS

| | | |
|---|---|---|
| 146126 | 4/1952 | (AU) . |
| A1 40301/78 | 4/1980 | (AU) . |
| 69875/87 | 10/1987 | (AU) . |
| 605-421 | 9/1978 | (CH) . |
| 0 128 782 | 12/1984 | (EP) . |
| 95 91 8456 | 4/1997 | (EP) . |
| 432101 | 7/1935 | (GB) . |
| 2270395A | 3/1994 | (GB) . |
| 59-189988 | 10/1984 | (JP) . |
| 59-189989 | 10/1984 | (JP) . |
| 59-189990 | 10/1984 | (JP) . |
| 4-90886 | 3/1992 | (JP) . |
| 5-245480 | 9/1993 | (JP) . |
| WO 89/08081 | 9/1989 | (WO) . |
| WO 90/10734 | 9/1990 | (WO) . |
| WO 93/05861 | 4/1993 | (WO) . |

* cited by examiner

Primary Examiner—Chester T. Barry
(74) Attorney, Agent, or Firm—Nath & Associates PLLC; Gary M. Nath; Harold L. Novick

(57) ABSTRACT

The invention provides a liquid purification apparatus (10) adapted to employ the combination of the purifying effects of the heavy metals copper and silver in conjunction with hydrogen peroxide and the catalytic reaction thereof. A body means (11, 12) defines a flow passage (13) having a liquid inlet (14) at one end and a liquid outer (16) at the other end. Flow passage (13) has a first electrolytic unit (60) containing at least one copper based anode (22) and a second electrolytic unit (62) containing at least one silver based anode (25) spaced downstream of first electrolytic unit (60). An electrical circuit means (32) supplies operating current thereto and flow passage (13) includes an inlet (34) for the controlled introduction of $H_2O_2$ from reservoir means (51) into flow passage (13) between first (60) and second (62) electrolytic units.

20 Claims, 5 Drawing Sheets

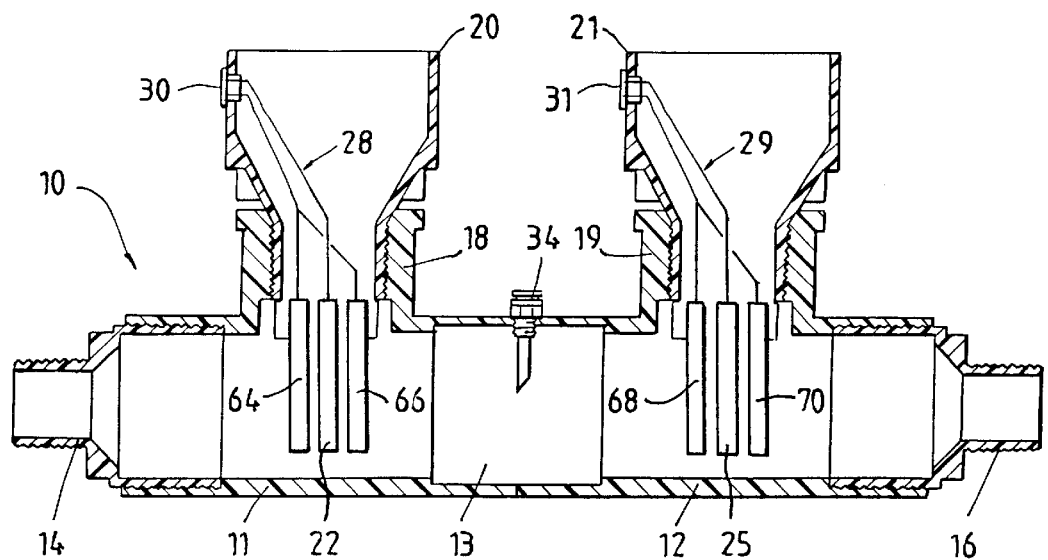
FIG. 6.
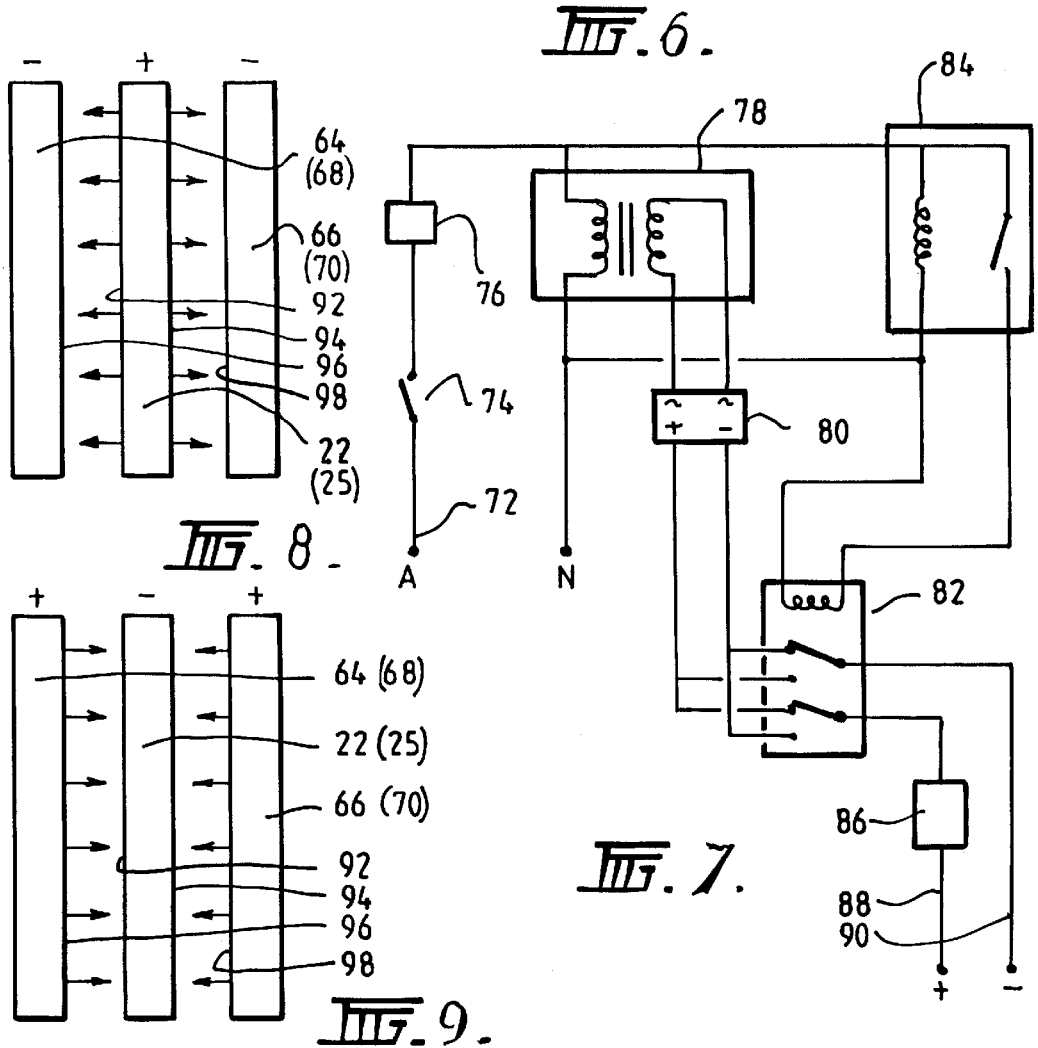
FIG. 8.
FIG. 7.
FIG. 9.

LIQUID STERILIZATION APPARATUS

TECHNICAL FIELD OF THE INVENTION

This invention relates to liquid purification apparatus and methods of using same. The invention is directed to apparatus for purifying water by the well-known process of heavy metal purification using the bacteriostatic effects of silver, as well as the algaecidal effect of copper, whilst hydrogen peroxide is introduced because of its catalysed decomposition by either one or both of these metals to produce oxygen. The invention will be described in the preferred embodiments in its particular application in destroying disease-carrying bacteria in drinking water, but it will become apparent that the invention is not limited to this particular field of use, with wider and different applications being possible.

BACKGROUND OF THE INVENTION

As is well known and made the subject of the prior art, the high affinity that Ag+ ions have to —SH and other groups makes it an efficient biocide. If hydrogen peroxide ($H_2O_2$) is simultaneously added the former causes a catalytic reaction with the $H_2O_2$ to increase the efficiency quite considerably as $H_2O_2$ is also a biocide. As a result, this process can be used to sterilise drinking water, or water that may be in contact with humans, such as water in pools, spas and the like.

Various attempts have been made in the past to devise apparatus and methods for the effective use of metal ions of silver and copper with $H_2O_2$, but for a number of reasons success has not been attained. In consequence, no marketable technology is currently available, due mainly to difficulties in handling the $H_2O_2$, and controlling the dosages required. Many prior proposals have involved usage systems requiring labour intensive packaging in an endeavour to achieve accurate levels of all three additives, namely Ag+, copper and $H_2O_2$. For example, U.S. Pat. No. 2,105,835 of Krause prescribed individual packaging, using tablet form, enclosed in soluble wrappings which gradually dissolve, encased in soluble crystals, powder mixes, adding to ice, and so forth. Likewise, United Kingdom specification No. 432101 of Katadyn A, G, discloses the use of packets, tablets, pills, capsules or ampoules, soluble coating of crystals or gelatine. Thus in the prior art the dosing of metals and $H_2O_2$ involved cumbersome procedures and apparatus, with the apparatus also being expensive to manufacture, and in the main only specific predetermined bodies of water could be treated.

A major problem with the prior art arose from the fact that the handling of $H_2O_2$ to perform the aforementioned functions had been found dangerous and likely to prove harmful to users. The strength of $H_2O_2$ required was between 30 to 50% strength, and this made it dangerous bearing in mind that $H_2O_2$ at even 8% strength is an irritant to the skin and is corrosive at 20%. To dose any large amount of water, such as 50,000 liters, using 15% strength $H_2O_2$ would require a massive volume of hydrogen peroxide, and obviously dosing with $H_2O_2$ at 50% strength would pose a serious health threat to the user.

OBJECTS OF THE INVENTION

The present invention has as its principal object to provide apparatus which will ameliorate at least some of the problems associated with the prior proposals by effectively controlling the dosages of silver ion release and copper ion release, as well as the supply of $H_2O_2$ relative to a predetermined and controlled flow of water which is subjected to said dosage, in a manner achieving both safety and increased efficiency of operation.

A further object of the invention is to provide apparatus of the type just described which will allow effective control of the dosing of the $H_2O_2$ and the metals within an in-line flow passage for the water, regardless of the volume being passed, or the actual flow rate, and regardless of contamination present.

Yet another object of the invention is to provide such apparatus and usage methods which will ensure that the opportunity of the $H_2O_2$ to come into contact with the user will be eliminated, while at the same time the dosing system will allow the introduction of all and any of the aforesaid elements, while avoiding wastage of any products involved and eliminating the production of chemical by-products eg hydroxides.

Other objects and advantages will be hereinafter apparent, such as providing advantages over the prior art in that the apparatus will not be subject to operational difficulties in areas where temperature variations may be extreme.

SUMMARY OF THE INVENTION

With the foregoing and other objects in view, the invention provides a liquid purification apparatus adapted to employ the combination of the purifying affects of the heavy metals copper and silver in conjunction with hydrogen peroxide and the catalytic reaction thereof, said apparatus including body means defining a flow passage having a liquid inlet at one end and a liquid outlet at the other end, said flow passage containing a first electrolytic unit containing at least one copper based anode, a second electrolytic unit containing at least one silver based anode spaced downstream of said first electrolytic unit, electrical circuit means being provided in association with the electrolytic units for supplying operating current thereto, and said flow passage including an inlet for the controlled introduction of $H_2O_2$ from reservoir means into said flow passage between said first and second electrolytic units.

The invention has a number of other broad aspects which will be apparent from the later described and illustrated embodiments which serve to show the many variations which may be selected. In a simple form, two identical inverted T-shaped housings may be connected in line so that they have a single inlet at one end and a single outlet at the other for connection to respective supply and delivery lines, with a single flow line therebetween into which the copper and silver electrolytic units extend radially from the upper body parts, both units being fitted in such manner that they may be easily removed when desired.

Typically, the silver electrolytic unit will comprise a single anode of silver having a pair of stainless steel cathodes at equal distances on opposite sides, all three suitably being in a radial plane extending longitudinally of the flow line. Similarly the copper electrolytic unit has a single copper anode and two stainless steel cathodes arranged in the same way and the same relative dispositions as just described for the silver unit, all cathodes and anodes being coplanar and having their free ends projecting into the chamber defining the flow line, while the opposite or fixing ends of the cathodes and anodes are connected to each other in each respective unit.

BRIEF DESCRIPTION OF DRAWINGS

In order that the invention may be more readily understood and put into practical effect, reference will now be made to the accompanying drawings, wherein:

FIG. 6 is a cross sectional side elevation of two interconnected bodies or housings, similar to that shown in FIG. 2, but showing an alternative arrangement employing three similar electrodes;

FIG. 7 is the power supply and wiring circuit diagram for the alternative arrangement shown in FIG. 6;

FIG. 8 is a schematic drawing showing the anode distribution and wearing mode provided by the alternative arrangement shown in FIG. 6, when the central electrode is acting as an anode; and FIG. 9 is a similar view to that of FIG. 8 with the central electrode acting as an cathode.

DESCRIPTION OF THE PREFERRED EMBODIMENTS

Figure 1:
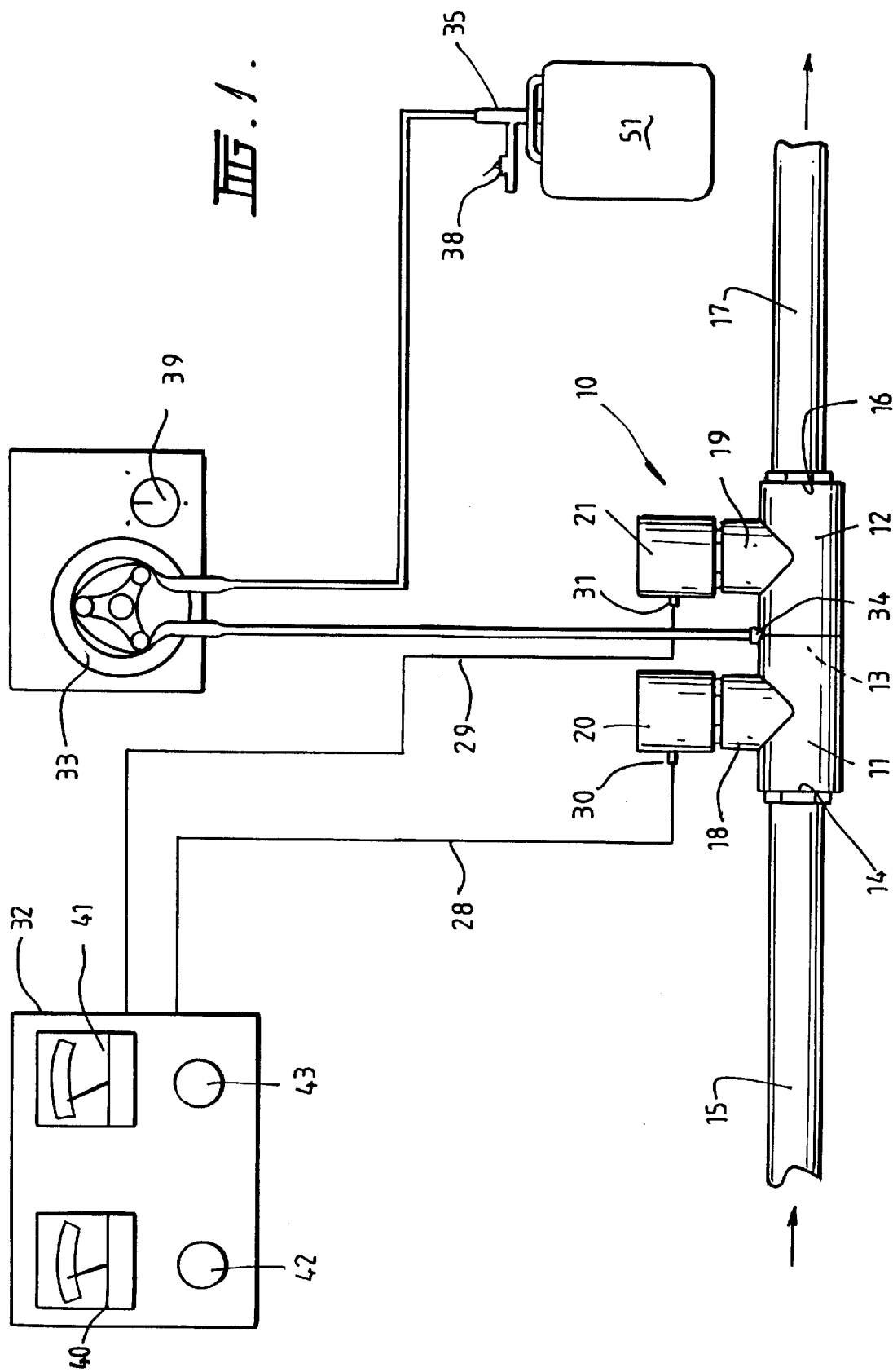
FIG. 1 shows schematically in elevational view the overall general arrangement of a first embodiment of a water purification apparatus according to the invention.

The apparatus shown in the drawings includes a treatment housing 10 having two interconnected bodies 11 and 12 defining a horizontal flow chamber or flow line 13 between an inlet end 14 connected to a supply pipe 15 and an outlet end 16 connected to a delivery pipe 17. Each body 11 and 12 has a top branch part 18 or 19 fitted with threadedly removable upper assemblies 20 and 21. The bodies 11,12 are preferably made of P.V.C. or other suitable material and have aligned or coaxial cylindrical chambers for the inlet end 14 and outlet end 16. The top branch parts 18 or 19 are perpendicular to flow line 13 and are fitted with electrodes and electrical connectors. In normal usage disposition of the apparatus, the aligned housings or bodies 11 and 12 have their axes contiguous and horizontal, but the upper parts could also operate if they extended down vertically or at any other convenient angle.

The assemblies 20, 21 contain electrolytic cells 60,62. It will be seen from FIG. 2 that there are six electrodes comprising a copper anode 22 in association with two stainless steel cathodes 23 and 24 to form cell 60, and a silver anode 25 in association with two stainless steel cathodes 26 and 27 to form cell 62, all being spacedly mounted as illustrated for the flow of water therepast. FIG. 2 shows the removable features of the upper parts which support the electrodes so that their fixing ends are interconnected and have respective circuit means 28 and 29 through plug-in means 30 and 31 (see FIG. 2) for connection in circuit to the control box 32. The control box 32 may receive electrical power from the same source that activates an electrical pump used to pump the water to the supply line or pipe 15. In turn, current is caused to flow between the electrodes, and at the same time a pump 33 will be actuated to draw $H_2O_2$ from a reservoir 51 to an entry port assembly 34 in housing 10. Entry port assembly 34 may be threadably engaged with flow line 13 so that its inner end is a delivery nozzle within flow line 13 whilst its outer end receives a supply tube, preferably nylon, coupled to pump 33. Pump 33 is of the peristaltic type but any suitable pump may be substituted. Pump 33 ensures that $H_2O_2$ is forced non-returnably into the pressurised water flow line 13. The operating pressure of pump 33 may be manually adjustable by means of control means 39 in FIG. 1. Pump 33 may, if required, be replaced by a gravity feed device or solenoid operated valve arrangement.

Figures 4, 5:
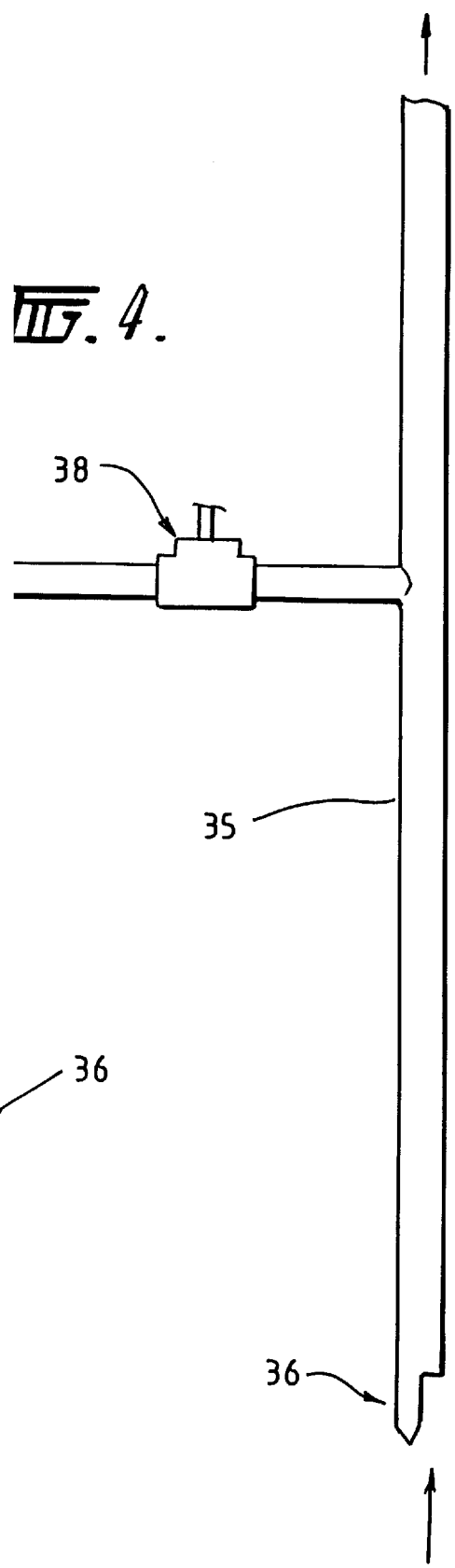
FIG. 4 shows the steel connecting tube for the $H_2O_2$ reservoir.
FIG. 5 shows an enlarged view of the cutting tip of the steel connecting tube shown in FIG. 4.

FIGS. 4 and 5 show a self-opening tube 35, preferably formed from stainless steel. having a lower cutting end 36 with cutting edges 37. Cutting edges 37 provide a self-drilling or tapping feature which allows tube 35 to be inserted into a sealed container 51 of $H_2O_2$. The cutting end 36 of stainless steel tube 35 is so shaped and designed as to allow full flow and at the same time be capable of performing a self-centring drilling action when turned like an auger. After the drilling has been completed tube 35 may be inserted to the full depth of container 51. Accordingly, an operator will not be exposed to $H_2O_2$ and no skin irritation can occur. Cutting edges 37 will also not impede flow of $H_2O_2$ into the tube 35. Near the $H_2O_2$ container 51, the upper eternally-exposed part of the inserted stainless steel tube 35 has a T-section arm fitted with a needle valve 38 for manual control. From this branch, other liquids that may be required from time to time may also be introduced into the water, such as hydrochloric acid or sodium hydroxide to obtain a pH balance, or to introduce corrosion inhibitors such as polyphosphates.

Figure 2:
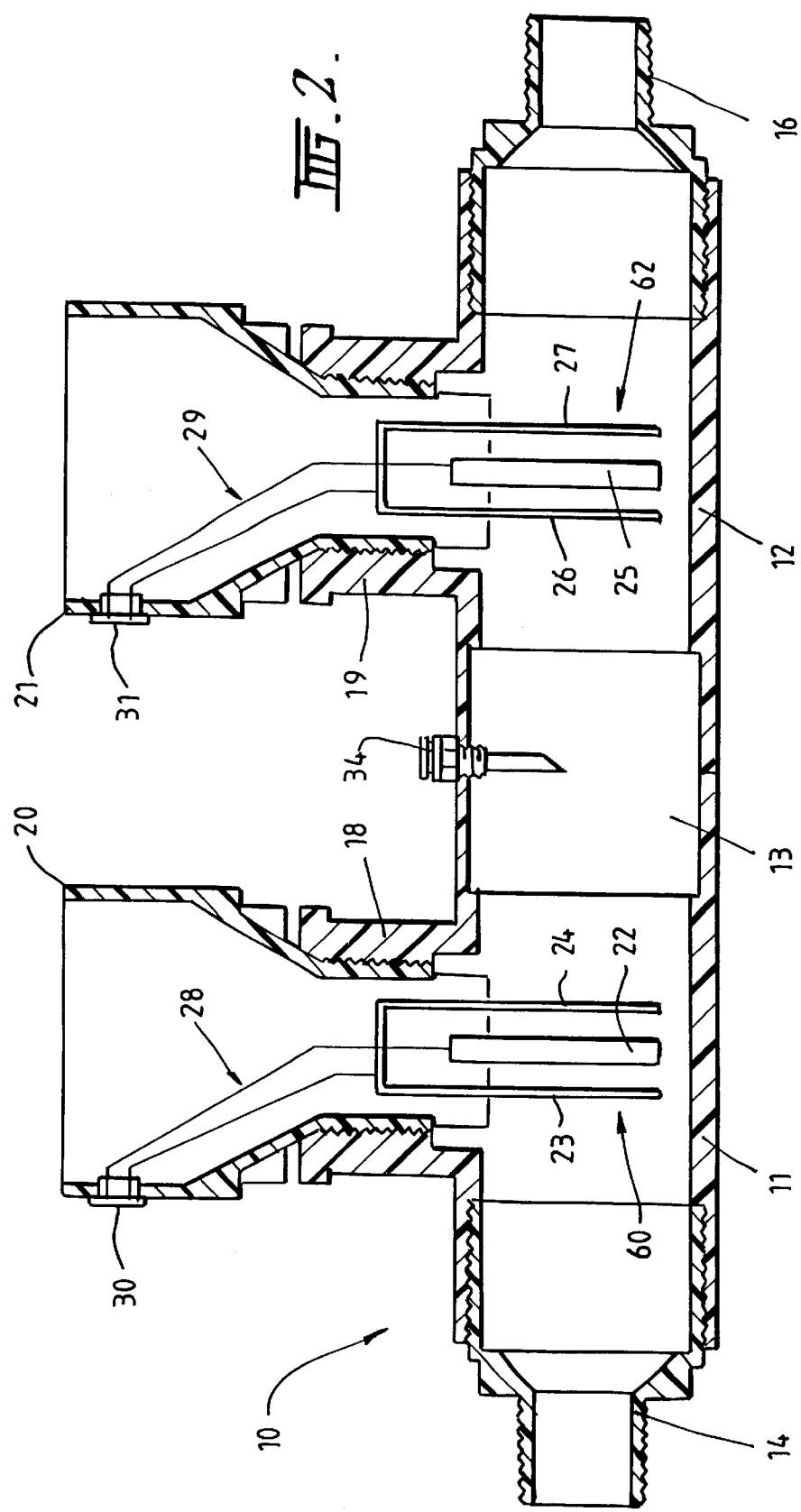
FIG. 2 shows in greater detail and in cross-sectional side elevation the two interconnected bodies or housings shown at the bottom of FIG. 1.
Figure 3:
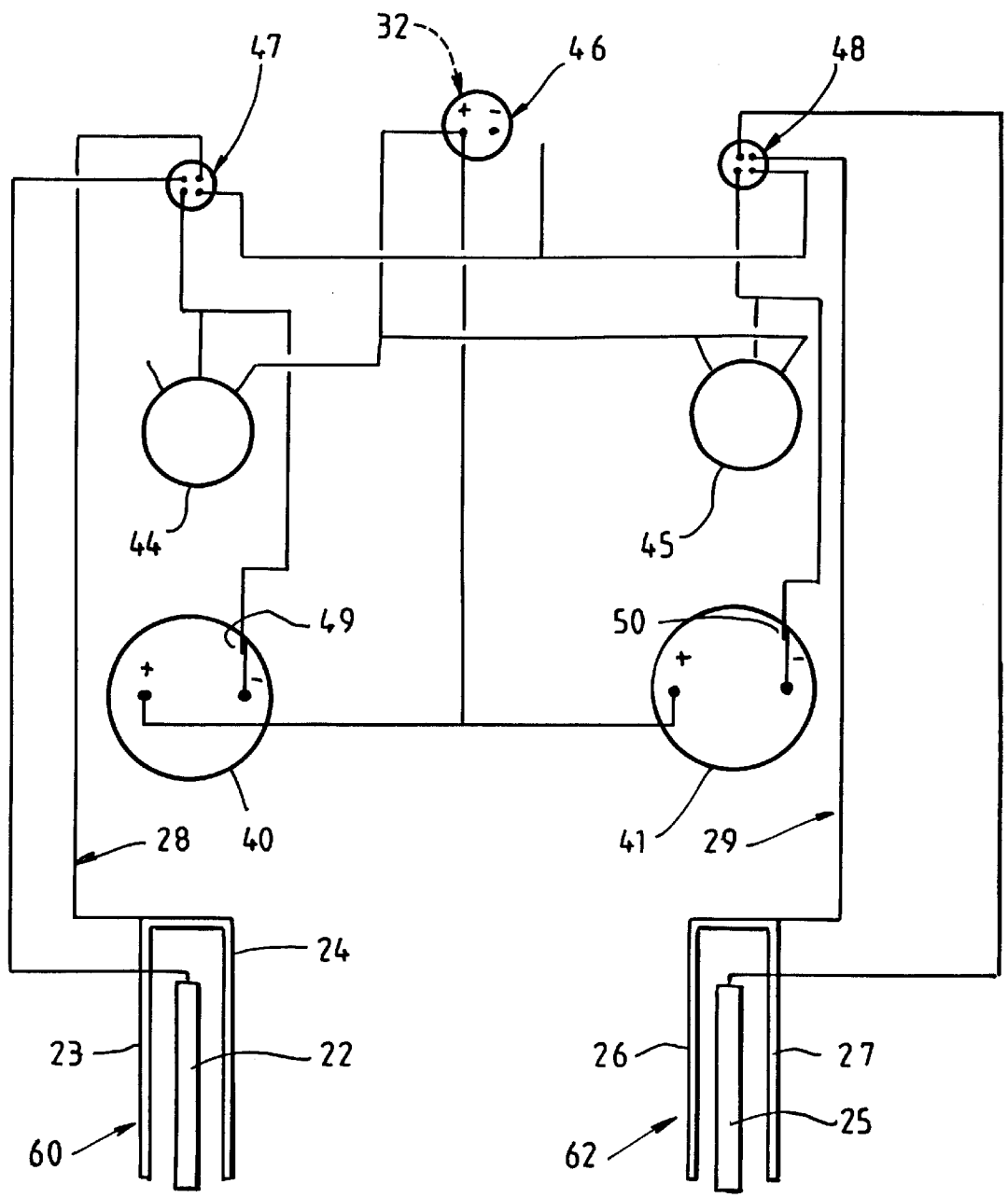
FIG. 3 shows in greater detail the electrical circuit means for the silver anode and copper anode units.

FIG. 1 also shows two current meters 40 and 41 for the copper and silver units, respectively, with manual knobs 42 and 43 for adjustably varying the rheostats 44 and 45 shown in the circuit diagram of FIG. 3. Numeral 46 indicates the power supply in, and the numerals 47 and 48 indicate the power supply out in respect of the two heavy metal units. The gauges or meters 40 and 41 are also shown in FIG. 3, each having resistor means indicated at 49 and 50.

The manner of operation will now be described. On start up, water flows in through supply pipe 15 and enters treatment housing 10. Pump 33 will draw $H_2O_2$ from container 51 and dispense the $H_2O_2$ through entry port assembly 34 into flow line 13. Electrolytic cells 60,62 will be activated to release copper and silver ions respectively into flow line 13. By placing the copper electrode 22 upstream of silver electrode 25 a synergistic reaction occurs with respect to the copper and silver ions released into the water and the $H_2O_2$. Total catalysation of $HO_2$ will occur resulting in hyper-oxygenation of the water. This contrasts with the prior art where hydroxyl production can occur. The introduction of the $H_2O_2$ after release of the copper ions and prior to the release of the silver ions provides this unexpected optimum hyper-oxygenation. By having silver electrode 25 downstream of copper electrode 22 the tendency of silver ions to silver plate the copper electrode is also substantially reduced and copper ion release is not hindered. This results in more effective use of the silver and a reduction in downtime for cleaning electrodes. The upper assemblies 20,21 are readily removed when desired, as will be the need in applications where copper, in particular, may become an electrolysis corrosion problem eg cooling towers.

In trialing and field testing the apparatus as aforedescribed, it has become apparent that the commercial viability of the technology therein could be enhanced by improvements relative to service aspects thereof. In this regard two main aspects of servicing have become apparent being regularly occurring problems involving additional manpower and time namely (1) cleaning of the anode and (2) replacing used anodes.

Naturally it is not possible to ameliorate the need to replace anodes as they are consumable items, and thus attention was directed to the development of a system which will eliminate the aspect of cleaning the anodes and in consequence extend the service life whereby anodes are replaced less frequently.

As FIG. 6 is very similar to FIG. 2 the same reference numerals will be used to show integers identical to those in FIG 2. As shown in FIG. 6 stainless steel cathodes 23,24 of the earlier embodiment have been removed and replaced by copper electrodes 64,66. Electrodes 64,66 are of the same size and composition as centre copper anode 22. Similarly, stainless steel electrodes 26,27 are replaced by silver electrodes 68,70. Reference should be made to FIG. 7 which shows the power supply and wiring circuit diagram to supply up to a 6v DC adjustable reversing current to the electrodes 22,64,66,25,68,70. An alternating current 72 is supplied through switch 74 and its voltage can be controlled by variable impedance 76. A transformer 78 reduces the alternating voltage to allow rectification to direct current by bridge rectifier 80. The direct current is connected to the contacts of a relay 82. A timer 84 controls relay 82 by switching the sets of contacts between the two illustrated positions. An ammeter 86 may be provided to give a visual indication of the current being drawn.

In the position shown in FIG. 7 positive terminal 88 will be connected to the anodes 22,25 whilst negative terminal 90 will be connected to the cathodes 64,66,68,70. As can be seen when timer 84 times out the relay contacts will be shifted causing terminals 88,90 to be reversed with terminal 88 becoming negative whilst terminal 90 will become positive. The reversing of the polarity is timed so as to create an even wearing and cleaning of all electrodes. Accordingly, central electrodes 22,25 will be anodes with the pairs of outer electrodes 64,66;68,70 being the cathodes, and when the current is reversed the centre electrodes 22,25 will be the cathodes and the outer electrodes 64,66;68,70 will be the anodes. This will allow cleaning of the anodes which attract different contaminants when acting as anodes. Copper and silver ions can be thus produced continuously in a cleaning mode. In practice, by setting timer 84 to activate the centre electrodes 22,25 as anodes for, say, 15 minutes and then reversing the polarity for, say, 30 minutes the outer two electrodes 64,66;68,70 are activated as anodes, an optimum condition is met. This switching can repeated in a continuous manner. Such a procedure will increase the life of the electrodes by up to three times FIGS. 8 and 9 show how the even wearing of all electrodes will take place. In FIG. 8 central electrodes 22,25 are acting as anodes and will release metal ions from two opposing surfaces 92,94 at the one time as shown by the arrows. However, once the current is reversed and the outer electrodes 64,66;68,70 act as anodes (FIG. 9), metal ions will be released from only one side 96,98 of each electrode 64,66;68,70, thus requiring twice as much time to reduce the size of the outer electrodes to the same size as the middle electrodes 22,25, and to produce the same amount of metal ions per minute as when the centre electrodes 22,25 acted as anodes. It will be apparent that at no time during the operation of the system will the release of metal ions be restricted.

It has been previously mentioned that the invention provides improvements in liquid purification apparatus, and it will be understood that there are many applications for purified water apart from drinking purposes. Not only is purified water desirable in pools and similar bodies of water, but is can be important for water used in hosing down carcasses and food containers for example. Also with increased demand for usage of sewage water for golf courses and golf greens, the invention is capable of disinfecting sewage water which is thereafter sprayed or otherwise applied to the golf greens or fairways, these being examples which further show the wide application of the invention.

The invention will be understood to embrace many further modifications as will be readily apparent to persons skilled in the art and which will be deemed to reside within the broad scope and ambit of the invention, there having been set forth herein only the broad nature of the invention and certain specific embodiments by way of example.

What is claimed is:

1. A liquid purification apparatus adapted to employ the combination of the purifying affects of the heavy metals copper and silver in conjunction with hydrogen peroxide and the catalytic reaction thereof, said apparatus including body means defining a flow passage having a liquid inlet at one end and a liquid outlet at the other end, said flow passage containing a first electrolytic unit containing at least one copper based anode, a second electrolytic unit containing at least one silver based anode spaced downstream of said first electrolytic unit, electrical circuit means being provided in association with the electrolytic units for supplying operating current thereto, and said flow passage including an inlet for the controlled introduction of $H_2O_2$ from reservoir means into said flow passage between said first and second electrolytic units.

2. The liquid purification apparatus as claimed in claim 1, wherein said controlled introduction of $H_2O_2$ is through a pump.

3. The liquid purification apparatus as claimed in claim 2, wherein said pump is of the peristaltic type.

4. The liquid purification apparatus as claimed in claim 1, wherein each electrolytic unit includes a single anode having a pair of stainless steel cathodes at equal distances on opposite sides of said anode, said anode and cathodes being spaced apart along and within said flow passage.

5. The liquid purification apparatus as claimed in claim 1, wherein each electrolytic unit includes a single anode having a pair of cathodes made of the same material as the anode on opposite sides of said anode, said anode and cathodes being spaced apart along and within said flow passage direction and electric control means to cyclically reverse the polarity of said anode and cathodes to effect a self-cleaning of said anode and cathodes.

6. The liquid purification apparatus as claimed in claim 1, wherein each electrolytic unit is mounted in an upper removable mounting assembly.

7. The liquid purification apparatus as claimed in claim 2, further including a tube having a free end adapted to drill into a sealed container forming said reservoir, said tube adapted to be inserted to the full depth of said container to allow said $H_2O_2$ to be drawn from said container by said pump.

8. The liquid purification apparatus as claimed in claim 1, wherein said reservoir means is a sealed container.

9. The liquid purification apparatus as claimed in claim 1, wherein said inlet for the controlled introduction of $H_2O_2$ from said reservoir means into said flow passage comprises a delivery nozzle projecting into said flow passage.

10. The liquid purification apparatus as claimed in claim 7, further including a branch in said tube for connection to at least one further container containing a solution.

11. The liquid purification apparatus as claimed in claim 2, wherein each electrolytic unit includes a single anode having a pair of stainless steel cathodes at equal distances on opposite sides of said anode, said anodes and cathodes being spaced apart along and within said flow passage.

12. The liquid purification apparatus as claimed in claim 3, wherein each electrolytic unit includes a single anode having a pair of stainless steel cathodes at equal distances on opposite sides of said anode, said anodes and cathodes being spaced apart along and within said flow passage.

13. The liquid purification apparatus as claimed in claim 2, wherein each electrolytic unit includes a single anode having a pair of cathodes made of the same material as the anode on opposite sides of said anode, said anodes and cathodes being spaced apart along and within said flow passage direction and electric control means to cyclically reverse the polarity of said anode and cathodes to effect a self-cleaning of said anodes and said cathodes.

14. The liquid purification apparatus as claimed in claim 3, wherein each electrolytic unit includes a single anode having a pair of cathodes made of the same material as the anode on opposite sides of said anode, said anodes and cathodes being spaced apart along and within said flow passage direction and electric control means to cyclically reverse the polarity of said anode and cathodes to effect a self-cleaning of said anodes and said cathodes.

15. The liquid purification apparatus as claimed in claim 2, wherein each electrolytic unit is mounted in an upper removable mounting assembly.

16. The liquid purification apparatus as claimed in claim 3, wherein each electrolytic unit is mounted in an upper removable mounting assembly.

17. The liquid purification apparatus as claimed in claim 3, further including a tube having a free end adapted to drill into a sealed container forming said reservoir, said tube adapted to be inserted to the full depth of said container to allow said $H_2O_2$ to be drawn from said container by said pump.

18. The liquid purification apparatus as claimed in claim 2, wherein said reservoir means is a sealed container.

19. The liquid purification apparatus as claimed in claim 3, wherein said reservoir means is a sealed container.

20. The liquid purification apparatus as claimed in claim 2, wherein said inlet for the controlled introduction of $H_2O_2$ from said reservoir means into said flow passage comprises a delivery nozzle projecting into said flow passage.

* * * * *